United States Patent [19]
Krotchko

[11] Patent Number: 4,576,845
[45] Date of Patent: Mar. 18, 1986

[54] THERMALLY CONDUCTIVE BASE LAYERS FOR CAST POLYURETHANE ROLL COVERS

[75] Inventor: Daniel J. Krotchko, Salisbury, N.C.
[73] Assignee: KRC Inc., Salisbury, N.C.
[21] Appl. No.: 561,945
[22] Filed: Dec. 15, 1983
[51] Int. Cl.$^4$ .................. B21B 1/00; D21F 0/00
[52] U.S. Cl. ........................ 428/36; 29/110; 57/1 R; 162/232; 428/425.8
[58] Field of Search .................. 428/36, 425.8

[56] References Cited
U.S. PATENT DOCUMENTS

| | | | |
|---|---|---|---|
| 2,333,922 | 11/1943 | Foster | 428/425.8 |
| 2,916,403 | 12/1959 | Calderwood | 428/425.8 |
| 2,992,939 | 7/1961 | Larson | 428/425.8 |
| 4,389,438 | 6/1983 | Ohtsuki | 428/35 |
| 4,389,457 | 6/1983 | Pauze | 428/425.8 |

Primary Examiner—Christopher A. Henderson
Attorney, Agent, or Firm—Fleit, Jacobson, Cohn & Price

[57] ABSTRACT

A roll comprising a hollow metal core member, an intermediate base layer or layer, and a polyurethane cover, the intermediate base layer compounded to have improved thermal conductivity. The intermediate base layer or layers having improved thermal conductivity function to dissipate heat generated by hysteresis (deformation energy), thereby permitting the rolls to operate at higher roll speeds and higher pressures without roll failure.

8 Claims, 2 Drawing Figures

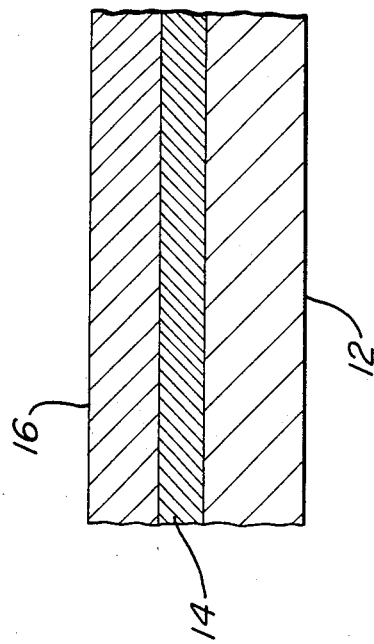

THERMALLY CONDUCTIVE BASE LAYERS FOR CAST POLYURETHANE ROLL COVERS

BACKGROUND OF THE INVENTION

1. Field of the Invention

The present invention relates to polyurethane covered rolls for use in various industrial applications such as papermaking, steel making and textile manufacturing. More specifically, this invention is directed to thermally conductive base layers for the polyurethane covering of these industrial rolls, the thermally conductive base layer functioning as a reinforcing layer and, additionally, providing a means for dissipating the heat generated in the polyurethane covering, the heat generation a result of energy loss due to elastic deformation of the roll cover during operation.

2. Description of the Prior Art

Roll coverings fabricated from polymeric or elastomeric materials are used for a wide variety of reasons in many industries. Generally speaking, roll covers perform one or more of the following functions:

1. Support, carry, drive, draw or brake product passing through the nip.
2. Remove or extract liquid from the product passing through the nip.
3. Impregnate or coat product passing through the nip.
4. Calendar or iron product passing through the nip.
5. Texture, emboss, print or imprint a pattern to the product passing through the nip.
6. Laminate layers of product or dissimilar layers of products passing through the nip.
7. Provide protection against corrosion.

The use of polymeric or elastomeric covered rolls adapted for use at high speeds of rotation and under heavy loads or pressures has become increasingly significant in recent years. Of particular interest and significance has been the polyurethane roll cover. The polyurethane roll cover provides excellent load bearing and extraction characteristics, high abrasion and wear resistance with better dynamic performance characteristics as compared to the more conventional elastomeric roll covers (chloroprene, styrene-butadiene, polyisoprene, acrylonitrile-butadiene, etc.)

Among the roll types currently in use are those comprising a rigid metallic structural member called a roll core designed to carry the applied load with a minimum amount of deflection. A resilient covering is sometimes bonded directly to the roll core. In many cases, a base layer and/or an intermediate layer is bonded to the roll core and the resilient roll cover is then bonded to the base or intermediate layer. The process can either be a one-step or two-step process. The base or intermediate layer may be a harder material similar to the cover or it may be made up of a fibrous reinforcing material impregnated with a thermosetting resin. The elastomeric or polymeric covering may be materials such as polyurethane, polyisoprene, chloroprene, styrene-butadiene, acrylonitrile butadiene and the like.

It is also known to utilize internally cooled calendering rolls. U.S. Pat. No. 4,256,034 to Kusters, issuing on Mar. 17, 1983, discloses a paper calendering apparatus comprising a pair of interacting calendering rolls, one of which includes a polyurethane covering. The polyurethane-covered roll additionally comprises means for internally cooling the roll in order to maintain the roll cover temperature below a certain minimum temperature. The Kusters' roll applies a cross-linked polyurethane covering directly to the metal core, there being no intermediate reinforcing member.

U.S. Pat. No. 3,082,683 to Justus, issuing on Mar. 26, 1963, directed attention to the problems associated with heat developed within the rubber coverings which could not be sufficiently dissipated by internal cooling of the roll core. The disclosed solution comprised creating a covering containing a plurality of coolant circulation paths for dissipating the heat developed during deformation of the covering. The elastomeric covering is applied directly to the roll core and the system involves a complicated apparatus for manifolding coolant to the axial coolant passages and recirculating the coolant through a heat exchanger.

Hess, U.S. Pat. No. 3,395,636, discloses the use of a dispersion of finely divided carbon particles distributed throughout the elastomeric covering of a processing roll consisting of an elastomeric covering and a hollow roll core of steel, cast iron or bronze. The elastomeric covering is applied directly to the metal roll core, there being no intermediate resin layer. The only material suggested by Hess for heat dissipation is finely divided carbon particles having a mean diameter particle size in the range of 10 to 40 millimicrons. Additionally, no mention of polyurethane as the elastomeric covering is included in the disclosure.

SUMMARY OF THE INVENTION

One of the limiting factors governing conditions of use for existing polyurethane covered, reinforced rolls is related to heat buildup in the roll cover itself resulting from high energy loss from repeated deformation of the roll cover in use. Present conditions of use involve high speeds, high roll pressures and severe application conditions such as heat, moisture, chemicals, etc. Existing rolls do not have the capability of satisfactorily dissipating the heat buildup. Polyurethane, while providing many advantages, is a poor conductor of heat and also generates, relatively, a large hysteresis. This combination of circumstances has resulted in severe limitations on roll speed and pressures and, additionally, is responsible for numerous roll failures due to increase in elastic deformation heat buildup until the elastic limits of the cover are exceeded. The failures usually occur at the interface between the roll cover and the base layer or as actual "melt downs" of the polyurethane. "Sleeving off" of the entire roll cover is known to occur as well.

Thus a need has continued to exist for a processing roll comprising a hollow metal roll core, an intermediate base layer and a polyurethane cover which has the capability of successfully dissipating the high amounts of heat generated by high deformation energy loss due to conditions of roll pressure, roll speed, and operating conditions of current industrial requirements.

It is an object of this invention to provide a roll comprising a hollow core member, an intermediate base layer or layers and a polyurethane cover, said roll capable of operating at loads and/or speeds higher than those previously attainable.

It is a further object of this invention to provide a roll comprising a hollow core member, an intermediate base layer or layers, and a polyurethane cover having a useful life superior to that of previous rolls.

It is still a further object of this invention to provide a roll comprising a hollow core member, an intermediate base layer or layers and a polyurethane cover having the capability of dissipating heat generated by energy loss due to deformation during operation.

These and other objects are obtained by a roll comprising a hollow metal core member, an intermediate base layer or layers and a polyurethane cover, the intermediate base layer being thermally conductive. The thermally conductive intermediate layer provides a means whereby the heat buildup in the polyurethane cover is conducted through the intermediate layer to the metal roll and thereafter dissipated. Higher roll speeds and roll pressures are obtainable in this way, with increased roll life as well.

BRIEF DESCRIPTION OF THE DRAWINGS

FIG. 2 is a fragmentary enlarged sectional view of the roll of FIG. 1.

DESCRIPTION OF THE PREFERRED EMBODIMENT

Figure 1:
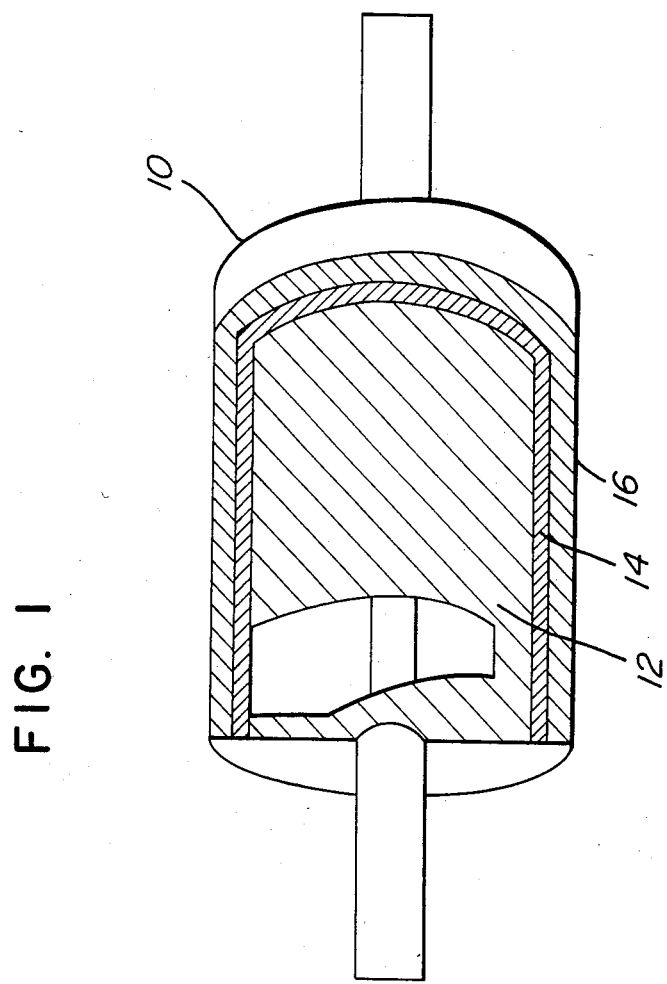
FIG. 1 is a partially cut away view of one form of roll structure depicting the hollow metal core member, the intermediate base layer or layers and the polyurethane elastomer cover.

Referring now to FIG. 1, roll 10 comprises a hollow metal core element 12, an intermediate thermally conductive base layer or layers 14 and a polyurethane cover 16.

Hollow metal core element 12 is made from metals well known in the roll making industry. Such metals include steel, steel alloys, cast iron, cast steel, and bronze, but are not limited to these metals. Methods of producing the hollow roll core element 12 are well known to the art as is the hollow core roll element itself.

The intermediate thermally conductive base layer or layers 14 comprises a hard polymeric material compounded to have increased thermal conductivity. The hard polymeric materials are vulcanized rubbers and thermosetting resins. Typical vulcanizable rubbers include, but are not limited to, polyisoprene, styrene-butadiene, chloroprene, acrylonitrilebutadiene, carboxylated nitrile and/or blends of these polymers and/or others not listed. Typical thermosetting resins include, but are not limited to, polyesters, phenolics and epoxies. The base layer or layers may be in the form of a structurally independent element or compounded to lend itself for use as an impregnant or coating. In a preferred embodiment, the intermediate base layer or base layers, vulcanizable rubber or thermoset resin is used as an impregnant in combination with reinforcing fibrous material, optionally in the form of a cloth or matt. Suitable reinforcing fibrous materials include, but are not limited to, naturally occurring fibers such as fiber glass, crocidilite and synthetic fibers such as polyester, polyamide, polyacrylonitride, vinyl chloride-acrylonitride copolymers, and the like.

The intermediate base layer or layers is compounded to have increased thermal conductivity by the incorporation of thermally conductive materials such as thermally conductive metals in the form of wire, woven or knitted wire in the form of cloth, tape or fabric, composite fabrics woven of thermally conductive materials in combination with non-thermally conductive materials, or wire cord. Typical thermally conductive metals include steel, stainless steel, bronze, copper and aluminum. Applicant does not intend, however, that the above list be limiting, rather, only exemplary.

Other thermally conductive materials include metallic flake, powder, chopped metallic fibers and other thermally conductive reinforcing fillers and pigments such as carbon black, graphite, silicon carbide and petroleum coke. Within the contemplation of the instant invention are those embodiments wherein a thermoset resin or vulcanizable rubber is compounded with the last-mentioned thermally conductive materials and used alone or to impregnate or coat the fibrous reinforcing materials above. The intermediate layer typically has a thickness in the range of 2 to 7 mm.

The polyurethane elastomeric covering 16 comprises those polyurethanes known and used in the art. Typical polyurethane elastomers are TDI and/or MDI terminated resins as polyether, polyester, and/or polyether-polyester blends. The polyurethane cover layer has a typical thickness in the range of 7 to 25 mm, with a preferred thickness in the range of 10 to 15 mm.

Referring now to FIG. 2, a fragmentary sectional enlargement, 12 represents the metal core element, 14 the intermediate thermally conductive base layer, and 16 the polyurethane cover.

In another embodiment of this invention, not shown in the drawings, the hollow metal core element 10 is adapted to be internally cooled by the passage of cooling fluids therethrough. The technology for the internally cooled hollow roll cores is well known. Such an internally cooled roll core and roll is disclosed in U.S. Pat. No. 4,256,034, mentioned above and incorporated by reference hereto.

The polyurethane elastomer covered rolls of this invention may be prepared in the following manner. Referring again to FIG. 1, a suitable roll core 12 is treated to afford proper adhesion of the intermediate base layer 14. Suitable methods of treatment include degreasing with a suitable solvent such as trichloroethane to remove any residual deposits of grease and oil. Following degreasing, the portion of the roll to be coated is then sand- or grit-blasted or otherwise treated with a suitable abrasive material to remove all traces of rust and corrosion and to roughen the surface. The roughening of the outer surface can be achieved by a multiplicity of substantially parallel grooves formed about the circumference of the roll core. However, any other means applicable for roughening the outer surface of the roll core to ensure firm adherence of the intermediate base layer of layers 14 is within the contemplation of the disclosed invention. Alternative methods of roughening the surface include, but are not limited to, tooling, pickling and etching.

In one embodiment of the invention, following the surface preparation of the roll core, an adhesive is applied to the roll core as a prime coat. Suitable adhesive prime coats include, but are not limited to, polyester, phenolic, or epoxy primer coatings. However, application of the primer coat is not required in every instance.

The thermally conductive base layer or layers are then applied to the prepared roll core surface. This thermally conductive base layer or layers may consist of any or a combination of the following materials: (1) a hard polymeric substance which has been compounded specifically for increased thermal conductivity; (2) a thermally conductive hard polymeric substance as above, but compounded additionally to lend itself to be used as an impregnant and coating to impregnate and coat a reinforcing cloth, cloth/wire, wire, woven or knitted wire cloth, or the like; (3) a reinforcing fiber coated and impregnated and further compounded to include thermally conductive materials such as metal flake, metal powder, carbon black and the like. Where the polymeric substance is a vulcanizable material, the composite base structure is then vulcanized or cured, usually in an autoclave. Alternatively, where the polymeric substance is a thermosetting resin, the thermosetting resin is subjected to the appropriate curing step in order to thermoset said resin.

Typical methods of application of the thermally conductive intermediate base layer or layers include lay-up of calendered sheet, either by hand or mechanical means, extrusion, rotational casting and spiral winding.

Following application and vulcanization or curing of the thermally conductive intermediate base layer or layers, the layer or layers are then tooled or ground to a specified size, at the same time providing symmetry to the roll.

The next step in the process of producing the roll involves treating the thermally conductive intermediate base layer in a manner to make it acceptable for bonding of a cast polyurethane roll cover. Various methods of surface preparation are well known in the art. In one embodiment, the heat hardened, thermally conductive layer is washed with a solvent, the layer grit-blasted, rough-machined again to ensure symmetry, and placed in a mold where a suitable polyurethane covering material is cast to the intermediate base layer. Optionally, an adhesive layer may be applied to the intermediate base layer prior to application of the polyurethane elastomeric coating.

The resulting polyurethane covered roll, more readily dissipates heat generated by hysteresis as a result of roll cover deformation, thereby permitting operation at higher speeds and pressures than previously achieved. Additionally, since the base layer has increased thermal conductivity, internal cooling of the roll cover can be utilized more effectively in a water-cooled roll since the effects of the water cooling passing through the interior of the roll core help cool the critical areas within the roll cover and/or at the roll cover-base layer interface.

Having now generally described the invention, the same will be better understood by reference to certain specific examples, which are included herein for purposes of illustration only and are not intended to be limiting of the invention or any embodiment thereof, unless specified.

EXAMPLE 1

A base layer to be applied to a roll core is rendered thermally conductive either by the addition of thermally conductive materials such as metallic powders or chopped metallic fibers to a commercially available thermally conductive impregnating resin, such as Conapoxy FR-1259 [thermal conductivity of 7 BTU/(sq ft ) (hr.) (°F./in.)] and/or the reinforcing fabrics, cloths, mattes containing, as part of their makeup, continuous threads of metal or metal fibers such as stainless steel [113 BTU/(sq ft) (hr.) (°F./in.)] aluminum [1500 BTU/(sq ft) (hr.) (°F./in.)] bronze [1300 BTU/(sq ft) (hr.) (°F./in.)] or the like.

The thermally conductive base layer is applied to a properly prepared roll core by any of the methods conventional to the art. After the base layer has been thermally set, the layer is then tooled and/or ground to a specified size, and prepared to accept the cast polyurethane covering.

EXAMPLE 2

An elastomer, compounded similar to Formula 1 below, is applied to a properly prepared roll core either through extrusion of the compound onto the roll core or by lay-up of calendared sheet to the roll core, both methods state-of-the-art manufacturing procedures. The base layer is vulcanized in an autoclave, then tooled and/or ground to a specified size, and prepared to accept the cast polyurethane covering.

EXAMPLE 3

The base layer, compounded similar to Formula 1, is put into solution (30–70% solids) and spread coat onto a reinforcing thermally conductive cloth, matte, metallic woolen matte, etc., impregnating and coating the reinforcing material. This coated, dried material is then either spirally wound onto a properly prepared roll core in the form of a tape or plied up onto the roll core to a specified thickness. The base is then vulcanized in an autoclave, tooled and/or ground to a specified size and prepared to accept a cast polyurethane covering.

EXAMPLE 4

The base layer, compounded similar to Formula 1, is applied (on a calendar) onto a reinforcing thermally conductive cloth, matte, metallic woolen matte as a skim coating, penetrating into the interstices as well as coating the surfaces of the reinforcing material. This skimmed, thermally conductive reinforcing material is then either plied up or spirally wound as a tape onto a properly prepared roll core to a specified thickness. The base is then vulcanized in an autoclave, tooled and/or ground to a specified size and prepared to accept the cast polyurethane covering.

| FORMULA 1 | |
| --- | --- |
| Hard Base Compound | RHC |
| NBR | 100.00 |
| Hard NBR Dust | 50.00 |
| Fine Metallic Powder | 50.00 |
| Bronze Wool Chopped | 20.00 |
| Dioctyl Phthalate | 25.00 |
| N650 Black | 40.00 |
| Coumarone Indene Resin | 10.00 |
| Zinc Oxide | 5.00 |
| Stearic Acid | 1.00 |
| Butyraldehyde Aniline | 1.00 |
| Sulfur | 40.00 |
| | 340.00 |

Having now fully described the invention, it will be apparent to one of ordinary skill in the art that many changes and modifications can be made thereto without departing from the spirit and scope of the invention as set forth herein.

What is claimed is:

1. A pressure roll having a flexible outer cover and adapted for cooperative, contacting engagement with another roll to define a nip area at which the outer cover of the pressure roll is deflected by the cooperating roll, said pressure roll comprising: a hollow metal core member having a cylindrical outer surface; a flexible outer polyurethane cover overlying the outer cylindrical surface of said core member; and an intermediate base layer interposed between said core member and said cover, said intermediate base layer including a polymeric substance and a thermally conductive material, said polymeric substance selected from the group consisting of thermosetting resins and vulcanized rubbers, said intermediate base layer having a thermal conductivity sufficient to conduct heat buildup from said cover to said core member.

2. The roll of claim 1 wherein the hollow metal core member comprises a metal selected from steel, steel alloys, cast steel, bronze, or cast iron.

3. The roll of claim 1 wherein the thermosetting resin is selected from epoxy resins, phenolic resins and polyester resins.

4. The roll of claim 1 wherein the vulcanized rubbers are selected from polyisoprene styrene-butadiene, chloroprene, acrylonitrile-butadiene, carboxylated nitriles, or blends of these polymers and/or others not listed.

5. The roll of claim 4 wherein the polymeric substance is in the form of a material suitable for impregnating a reinforcing element.

6. The roll of claim 5 including a reinforcing element selected from reinforcing cloth, cloth/wire, woven or knitted wire cloth, wire in the form of a fabric, tape or cord, chopped metal strands or fibers.

7. The roll of claim 1 wherein the thermally conductive material is selected from the group consisting of thermally conductive metals and thermally conductive reinforcing fillers and pigments.

8. A rotatable industrial pressure roll for use in papermaking, steel making, textile manufacture, and the like, and having a flexible outer cover adapted for cooperative, contacting engagement with another roll to define a nip area at which the outer cover of the pressure roll is periodically deflected, said pressure roll comprising: a hollow metal core member having a cylindrical outer surface; a flexible outer polyurethane cover overlying the outer cylindrical surface of said core member; and an intermediate base layer interposed between said core member and said cover, said intermediate base layer being designed for and having an increased thermal conductivity so as to conduct heat buildup generated by factors such as roll pressure and speed, from said cover to said core member.

* * * * *